(12) United States Patent
Song

(10) Patent No.: US 6,950,093 B2
(45) Date of Patent: Sep. 27, 2005

(54) MOUSE HANDLED IN HAND

(75) Inventor: Bo-Jun Song, ChangChi (CN)

(73) Assignee: Aiptek International Inc., Hsinchu (TW)

( * ) Notice: Subject to any disclaimer, the term of this patent is extended or adjusted under 35 U.S.C. 154(b) by 311 days.

(21) Appl. No.: 10/216,837

(22) Filed: Aug. 13, 2002

(65) Prior Publication Data

US 2004/0032397 A1 Feb. 19, 2004

(51) Int. Cl.⁷ .................................................. G09G 5/08
(52) U.S. Cl. ....................... 345/163; 345/164; 345/167
(58) Field of Search .................................. 345/156–174; 250/221

(56) References Cited

U.S. PATENT DOCUMENTS

| | | | | |
|---|---|---|---|---|
| 5,063,289 A | * | 11/1991 | Jasinski et al. | 250/221 |
| 5,583,541 A | * | 12/1996 | Solhjell | 345/163 |
| 6,476,375 B1 | * | 11/2002 | Nicoud et al. | 250/221 |
| 6,545,667 B1 | * | 4/2003 | Lilenfield | 345/169 |

* cited by examiner

Primary Examiner—Sumati Lefkowitz
Assistant Examiner—Srilakshmi K Kumar
(74) Attorney, Agent, or Firm—Troxell Law Office, PLLC

(57) ABSTRACT

The invention is a mouse handled in hand, especially the mouse can be put both on a table surface and into a palm. The mouse comprises: at least one house; at least one switch button; a trackball, which is on a different surface of the house than a surface where the switch button is on; at least one brace apparatus, which supports the trackball when the mouse is placed at any angle; and at least one tracing trackball apparatus, which connects to the trackball to collect trackball rolling information. The tracing trackball apparatus comprises: at least two shading wheels, which have rims with gear shapes and two elongating arms against to the trackball; at least two reposition objects, which are behind elongating arms for elongating arms being tightly pushed onto trackball via elasticity; at least two photosensitive apparatuses, which are constructed by two sets of LEDs and light receivers, wherein between the LED and the light receiver is the shading wheel, therefore poking trackball to drive shading wheel, and simultaneously LED emits light to go through the gear shape of the rim of shading wheel for generating intermittent light signals; and at least one transform switch, which receives the intermittent light signals from photosensitive apparatuses, and when the mouse are on table upside down, both vertical and horizontal signals are just opposite, the transform switch is to alter signals.

5 Claims, 3 Drawing Sheets

MOUSE HANDLED IN HAND

FIELD OF THE INVENTION

The invention relates to a mouse handled in hand, especially the mouse can be put both on a table surface and into a palm.

BACKGROUND OF THE INVENTION

Mouse is an important external equipment for computer. No matter the present mouse is manufactured by different ways, the mouse are always used on a table surface or a mouse pad and user's hands and arms will be then against to the table surface or the mouse pad for a long time. Everybody would know that to keep this kind of posture is easily to get tired; besides, a distance between the user and a computer screen is close enough to have eyestrain.

Currently cursor positioning and input information of computer both depend on the mouse to finish, because mouse is nimble. The inconvenient is as aforesaid that to ache hands and arms; on the other hand, there are two conditions for moving mouse, which are free space and a flat surface. Furthermore, to go along with the developing wide band, the growing multimedia terminal technology and the bigger screen day by day, a new type of mouse with features of more convenient, more nimble, not occupying much space and remotely handling in hand is then gradually formed to meet more requirements of our life.

According to these problems and through long time of thinking and research, the applicant has proposed a device that may collect solar energy as an auxiliary power source, such that the using time of the electronic product is prolonged, and a preferred structure is obtained after many tests and modification made by the inventor.

SUMMARY OF THE INVENTION

The main objective of the present invention is to offer a mouse, which can be both handled in hand and used on a table surface as current mouse.

For your esteemed members of reviewing committee to further understand and recognize the objects, the characteristics, and the functions of the structures of the present invention, a detailed description matched with corresponding drawings are presented as follows.

DETAILED DESCRIPTION OF THE INVENTION

The present invention adopts a method to fix a trackball on a position of the present invention but still moving agilely. That is to freely poke at the trackball for moving a cursor on a screen. Besides, a button of the present invention is designed on another side of the present invention.

The advantage of the present invention lets the mouse be handled in hand or on a table as traditional usage. To hold mouse in hand will greatly decrease uncomfortable feeling of hand and arm; besides, the distance between the user's eyes and the computer screen is freely changeable to avoid eyes ache. As we can see, to comfort user will directly create both the cost saving and the reliable work.

Figure 1:
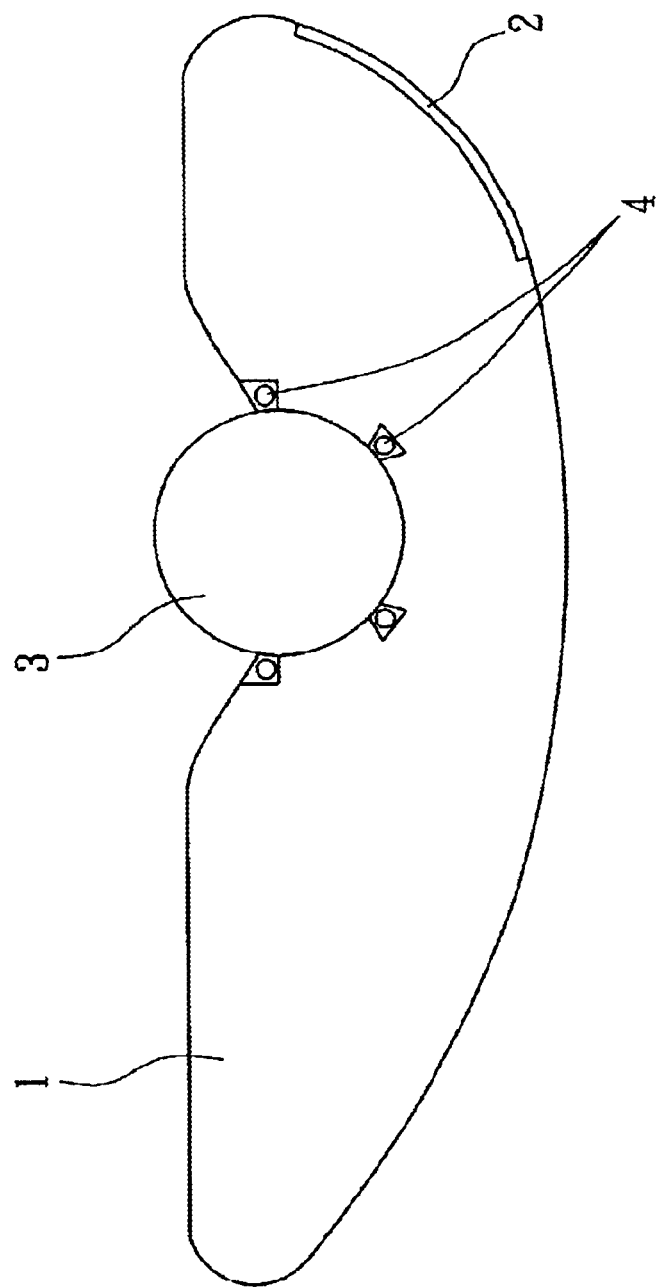
FIG. 1 is a side view of a section of the present invention.
Figure 2:
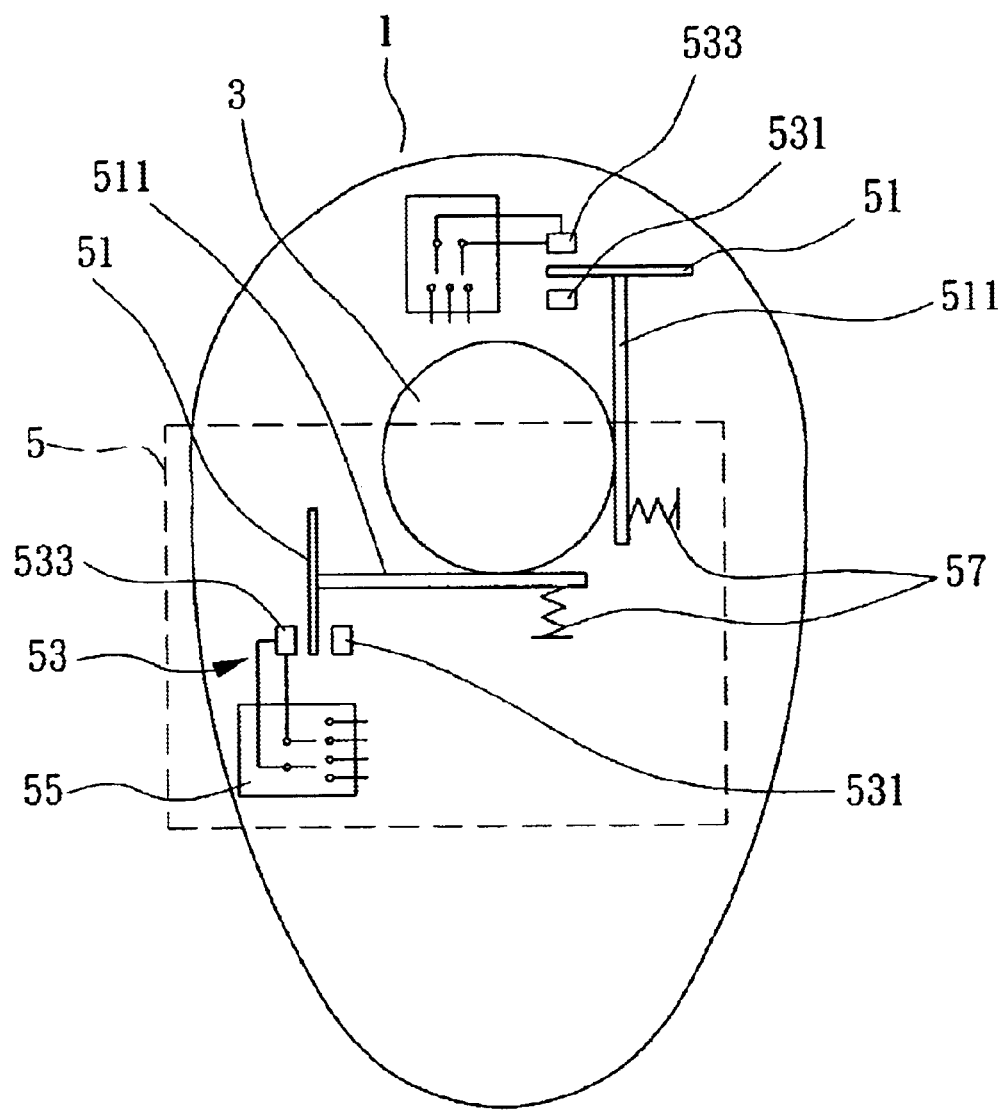
FIG. 2 is a top view of a section of the present invention.

Please refer to FIG. 1 and FIG. 2, which are a side view of a section of the present invention and a top view of a section of the present invention. The present invention comprises: a house 1, a switch button 2, a trackball 3, a brace 4 and a tracing trackball apparatus 5, which involving plural shading wheels 51, contacting to the trackball 3, plural reposition springs 57 on the shading wheels 51, plural photosensitive tubes 53 and plural transform switches 55; wherein two shading wheels 51 further equip two elongating arms 511 for each, and each photosensitive tubes 53 includes one set of a light emitting diode (LED) 531 and a light receiver 533.

The present invention can be either held or taken by hand when usage. A relative position of the trackball 3 where is especially for a thumb. The brace 4 with two layers is to keep and support trackball 3. The house 1 around trackball 3 is downward to retain trackball 3 for freely rolling. Thus, operations will be more convenient. There are three to four small balls distributed on each layer of brace 4 for trackball 3 flexibility. A thumb or other fingers can poke trackball 3 to direct output signals of shading wheels 51 and further a curser on a computer screen. The switch button 2 is on another surface corresponding to the surface with trackball 3 and handled by a forefinger or a middle finger. Therefore fingers and arms can keep away from table as always for the easiest operations.

The curser is moved by means of trackball 3 driving shading wheels 51 and photosensitive tubes 53. The detail description is as follows: shading wheels 51 have rims with gear shapes (not shown in figures) and two elongating arms 511 against to trackball 3. The two reposition springs 57 are behind elongating arms 511 for elongating arms 511 being tightly pushed onto trackball 3 via elasticity. The photosensitive tubes are constructed by two sets of the LED 531 and the light receiver 533, wherein between LED 531 and light receiver 533 is shading wheel 51, therefore poking trackball 3 to drive shading wheel 51, and simultaneously LED 531 emits light to go through the gear shape of the rim of shading wheel 51 for generating intermittent light signals. As the afore description, trackball 3 must contacts shading wheel 51 as good as possible, that is to say how important reposition springs 57 are. The mouse can be operated as traditional usage, which is to place the mouse on table upside down. After that, both vertical and horizontal signals are just opposite to before, so the transform switches 55 are to alter signals from photosensitive tubes 53.

Figure 3:
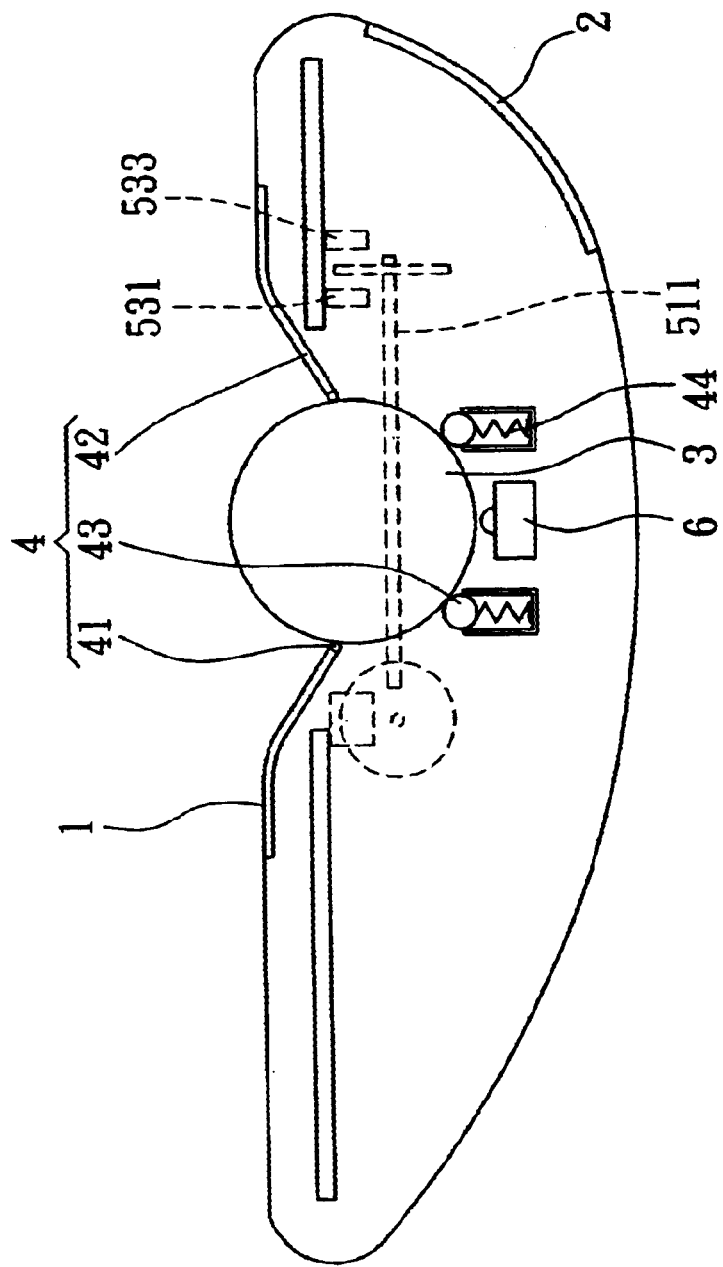
FIG. 3 is a preferred embodiment of the present invention.

Please refer to FIG. 3, which is a preferred embodiment of the present invention. The preferred embodiment has an indentation port, which is a cover ring 42 on brace 4. An inner diameter of the cover ring 42 is installed a plastic ring 41 with low friction and self-lubricating function. An inner diameter of the plastic ring 41 is smaller than a diameter of trackball 3. When assembling plastic ring 41 slightly being pressed down to trackball 3, a trackball 3 top is higher or same level than a bottom of the mouse. Trackball 3 is also supported by at least three ball bearings 43 (not shown in figure.) with elastic feature 44 from a bottom of trackball 3, therefore trackball 3 will be down to a micro switch 6 when trackball 3 being pressed, and continuously reverse signals are then generated. A ball in ball bearing 43 can be changed to another type, which is column shape. As prior experience, support area by column shape shall be larger than ball figure; besides only two roller bearings (column shape ) can satisfy the need of supporting trackball 3. The embodiment has the indentation port and brace 4 to approach the function as prior art when the mouse being placed upside down. An end of elongating arm 511 has set reposition spring 57 to adjust tiny variations of trackball 3 when mouse in normal and reverse position. Thus, elongating arms 511 will always keep good touch with trackball 3.

The present invention is with two features: firstly it can be handled in hand, that is the trackball is held in a certain place and poked by fingers; secondly it can be operated as prior art, such as on the table, legs, etc. The distance between user's eyes and screen then becomes variable. Further, user will not feel tired anymore, and the accompanying advantages are the low cost and reliable work.

In sum, the structural characteristics and each embodiment according to the invention have already disclosed in detail, sufficiently shown a progressiveness of deep execution on both object and function, extremely had the application in industry, and been never seen in current market, so the invention is completely fulfilled the merits of new-typed patent according to the description of the spirit of patent law.

However, the description mentioned above is only the preferable embodiments according to the invention, which should not limit the scope executed by the invention, and any variation and modification made according to the scope claimed by the invention application are all belonged to the covering scope of the patent of the present invention, so please your members of reviewing committee examine it accurately and permit it as a normal patent in a favorable way.

What is claimed is:

1. A mouse handled by a hand comprising:
   a) a house;
   b) at least one switch button connected to the house;
   c) a trackball;
   d) a brace connected to the house and having:
      i) a first layer having a cover ring and a plastic ring located on an internal circumference of the plastic ring between the cover ring and the trackball; and
      ii) a second layer having at least three ball bearings and a micro switch located between the at least three ball bearings, each of the at least three ball bearings being pressed against the trackball by a spring, the micro switch releasably engaging the trackball at a point between the at least three ball bearings, the first and the second layers engaging opposite sides of the trackball; and
   e) a tracing trackball apparatus engaging the trackball and collecting trackball-rolling information from movements of the trackball,
wherein the track ball is rotatably positioned in the brace and movable between first and second positions, in the first position the at least three ball bearings press the trackball against the plastic ring of the first layer, and, in the second position, the trackball compresses each spring of the at least three ball bearings and engages the micro switch of the second layer.

2. The mouse according to claim 1, wherein the tracing trackball apparatus (5) includes:
   i) a plurality of shading wheels;
   ii) a plurality of photosensitive apparatuses, each of the plurality of photosensitive apparatuses measuring movement of one of the plurality of shading wheels; and
   iii) at least one transform switch electrically connected to the plurality of photosensitive apparatuses.

3. The mouse according to claim 1, wherein each of the plurality of shading wheels includes an elongated arm and a reposition spring pressing the elongated arm against the trackball.

4. The mouse according to claim 1, wherein each of the plurality of photosensitive apparatuses including a light emitting diode and a light receiver located on opposite sides of each of the plurality of shading wheels.

5. The mouse according to claim 1, wherein each of the plurality of photosensitive apparatuses is a photosensitive tube.

* * * * *